United States Patent
Lee et al.

(10) Patent No.: US 6,977,830 B2
(45) Date of Patent: Dec. 20, 2005

(54) POWER SUPPLY APPARATUS

(75) Inventors: Jin-hyung Lee, Incheon Metropolitan (KR); Su-yong Hwang, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/847,914

(22) Filed: May 19, 2004

(65) Prior Publication Data

US 2004/0252532 A1    Dec. 16, 2004

(30) Foreign Application Priority Data

Jun. 12, 2003   (KR)   ................. 10-2003-0037830

(51) Int. Cl.[7] .............................................. H02M 7/04
(52) U.S. Cl. ..................... 363/89; 323/222; 323/285
(58) Field of Search ............................ 363/80, 82, 84, 363/89, 125; 323/220, 222, 282, 284, 285, 323/299

(56) References Cited

U.S. PATENT DOCUMENTS

| | | | | |
|---|---|---|---|---|
| 5,479,336 A | * | 12/1995 | Motoki et al. | ................. 363/89 |
| 5,532,918 A | * | 7/1996 | Mayrand et al. | ............... 363/89 |
| 5,818,707 A | * | 10/1998 | Seong et al. | ................... 363/89 |
| 6,069,470 A | * | 5/2000 | Feldtkeller | ................... 323/222 |
| 6,504,497 B2 | * | 1/2003 | Jang et al. | ................... 341/125 |
| 6,657,417 B1 | * | 12/2003 | Hwang | ........................ 323/222 |
| 6,714,429 B2 | * | 3/2004 | Phadke | ........................ 363/89 |

FOREIGN PATENT DOCUMENTS

KR    2002-0046609    6/2002

* cited by examiner

*Primary Examiner*—Gary L Laxton
(74) *Attorney, Agent, or Firm*—Sughrue Mion, PLLC

(57) ABSTRACT

Provided is a power supply apparatus which includes a comparator, an output voltage adjusting unit, a controller, and an output unit. The comparator compares a sensed AC input voltage to a reference voltage and outputs one of first through third comparison result signals. The output voltage adjusting unit outputs one of first through third output voltage level adjustment signals for changing the feedback output voltage level according to one of the comparison result signals. The controller outputs a switching signal. The output unit outputs a predetermined voltage by regulating and smoothing an input voltage induced to a secondary coil of a transformer by the switching signal. By adjusting the output voltage of a boost converter according to the input voltage, efficiency is increased because there is less power loss of the switching component, and the hold-up time may be adjusted even in a case of low AC input voltage.

6 Claims, 3 Drawing Sheets

PRIOR ART

POWER SUPPLY APPARATUS

BACKGROUND OF THE INVENTION

This application claims the priority of Korean Patent Application No. 2003-37830, filed on Jun. 12, 2003, in the Korean Intellectual Property Office, the disclosure of which is incorporated herein in its entirety by reference.

1. Field of the Invention

The present invention relates to a boost converter, and more particularly, to a power supply apparatus which adjusts the output voltage of a boost converter according to an input voltage.

2. Description of the Related Art

In general, in a case of an electro-communication machinery, a computer system and an electronic machinery with a large capacity, a switching mode power supply (SMPS), which converts ordinary input alternating current (AC) power to direct current (DC) power and then converts the AC power to DC power with the same power again using a switching step, is widely used.

FIG. 1 is a block diagram of the construction of a general boost converter power supply apparatus. A boost converter is a type of power supply apparatus that can always make output voltage higher than input voltage, and generates the regularly boosted output voltage from the regulated AC input voltage through a pulse width modulation (PWM) operation.

A regulator 100 shown in FIG. 1 is composed of a bridge diode circuit typically subjected to 90–260 VAC and the regulator 100 converts the input AC voltage into a DC voltage of a ripple waveform. A transformer T induces the predetermined voltage in a secondary coil by inputting the DC voltage from the regulator 100. A regulating diode D and a smoothing condenser C output a predetermined voltage $V_{out}$ by regulating and smoothing the voltage induced in the secondary coil of the transformer T. A switching unit Q is composed of a switching component such as a field effect transistor (FET), and its on/off time is controlled by a PWM control signal output from a controller 101. Therefore, the switching unit Q switches the operation of the transformer T by the PWM signal output from the controller 101.

The controller 101 senses the voltage $V_{out}$ output via the regulating diode D and the smoothing condenser C and then outputs a PWM signal, whose duty ratio is adjusted, to the switching unit Q. At this time, the controller 101 senses the input voltage and output voltage, and outputs the fixed PWM signal for generating the output voltage boosted further than the input voltage to the switching unit Q.

The description of the boost converter power supply apparatus is disclosed in U.S. Pat. No. 6,175,218.

The boost converter power supply apparatus is largely classified into a method of fixing the output voltage and a method of linearly changing the output voltage according to the input voltage.

The method of fixing the output voltage generates a fixed output voltage of 375~400VDC so as to correspond to all AC input voltage in a case where the boost converter is used for power factor correction (PFC) of a general AC input voltage. However, since a high voltage is always generated even when the AC input voltage is very low, a large switching loss occurs in the switching component, and therefore, the efficiency is decreased. Also, since the output voltage is fixed, in a case where an AC input voltage is input over 300V due to an unstable AC input voltage, products using the power of a particular province or a country must be redesigned.

The method of linearly changing the output voltage according to the input voltage solves the switching loss according to the fixed high output voltage. However, since an output voltage according to a low AC input voltage becomes too low, the energy stored in an output condenser C becomes small. Thus, a hold-up time, the time falling from full-charged voltage to minimum operation voltage of the product, becomes short, and a problem of power supply in the products requiring a long hold-up time occurs, especially, in the image products.

SUMMARY OF THE INVENTION

The present invention provides a power supply apparatus which decreases the power loss of a switching component by adjusting an output voltage of a boost converter according to an input voltage, adjusts a hold-up time even when an input voltage is low, and does not require a redesign of the power of a particular country or a province with unstable input voltage.

According to an aspect of the present invention, there is provided a power supply apparatus including: a comparator which compares a sensed AC input voltage to a reference voltage and then outputs one of first through third comparison result signals; an output voltage adjusting unit which outputs one of first through third output voltage level adjustment signals for changing the feedback output voltage level according to one of the first through third comparison result signals; a controller which outputs a switching signal whose duty ratio is adjusted according to one of the first through third output voltage level adjustment signals; and an output unit which outputs the predetermined voltage by regulating and smoothing an input voltage induced to a secondary coil of a transformer by the switching signal.

The apparatus further includes a voltage sensor which senses the input AC voltage and then outputs it to the comparator.

The comparator outputs a first comparison result signal showing a first fixed output voltage section in a case where the sensed AC input voltage is smaller than a first reference voltage, and outputs a second comparison result signal showing a linear output voltage section in a case where the sensed AC input voltage is between the first reference voltage and a second reference voltage, and outputs a third comparison result signal showing a second fixed output voltage section in a case where the sensed AC input voltage is larger than the second reference voltage.

The apparatus further includes an amplifier which amplifies the second comparison result signal.

The output voltage adjusting unit outputs first and third output voltage level adjustment signals which change the feedback output voltage levels according to the first and third comparison result signals into the predetermined fixed voltage levels, respectively, and outputs a second output voltage level adjustment signal which changes the feedback output voltage level according to the second comparison result signal into the predetermined linear voltage level.

The first through third output voltages are determined considering the required hold-up time, and the voltage condition and power efficiency of the power provided by a particular country or province.

BRIEF DESCRIPTION OF THE DRAWINGS

The above and other features and advantages of the present invention will become more apparent by describing in detail exemplary embodiments thereof with reference to the attached drawings in which:

FIG. 3 is a graph of input voltage versus output voltage according to an embodiment to which FIG. 2 is applied.

DETAILED DESCRIPTION OF THE ILLUSTRATIVE, NON-LIMITING EMBODIMENTS OF THE INVENTION

Figure 1:
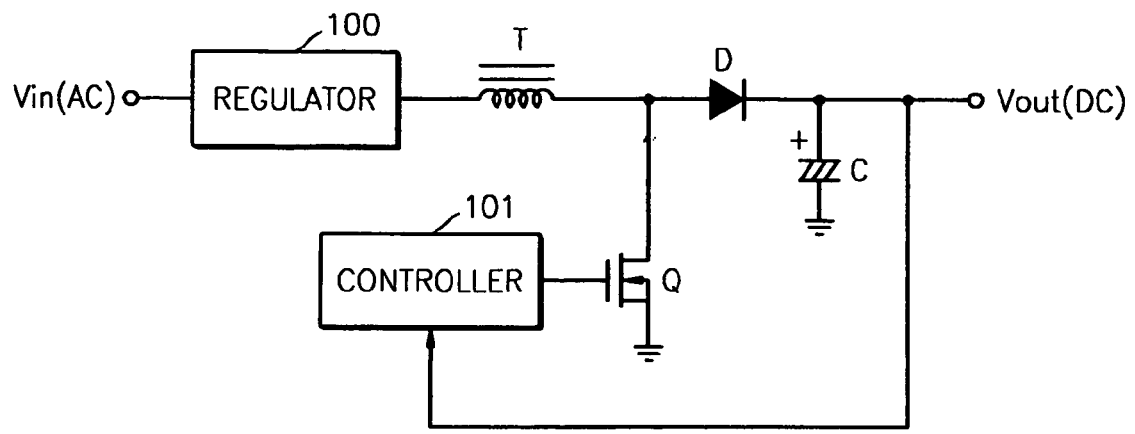
FIG. 1 is a block diagram of the construction of a general boost converter power supply apparatus.
Figure 2:
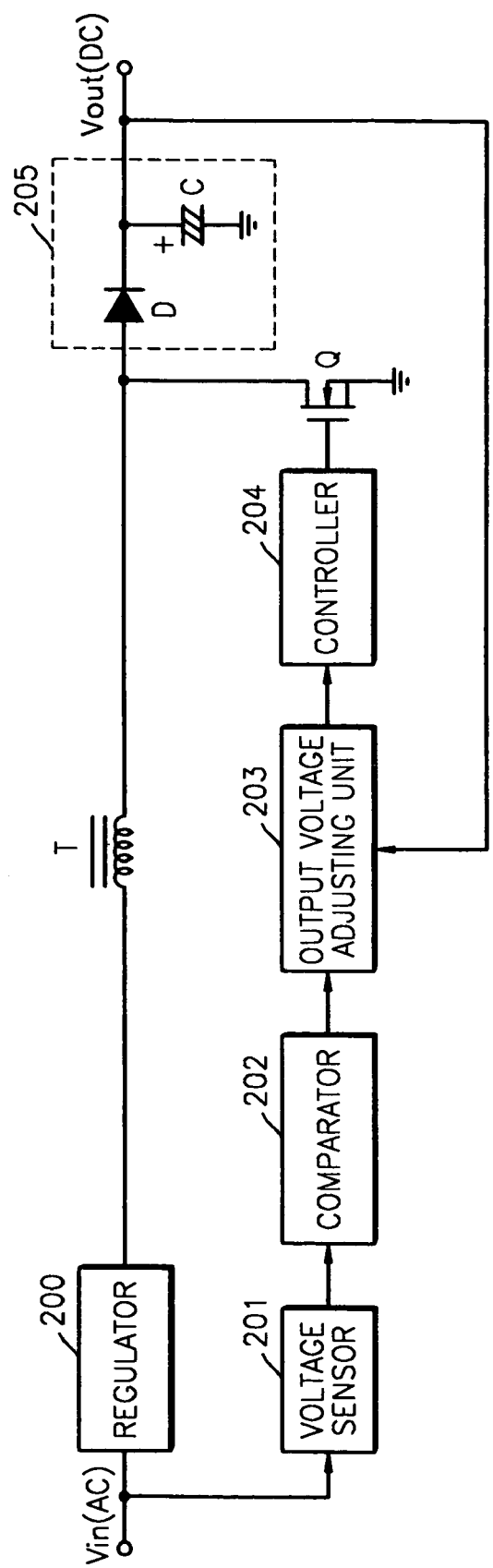
FIG. 2 is a block diagram of the construction of a boost converter power supply apparatus according to the present invention.

FIG. 2 is a block diagram of the construction of a boost converter power supply apparatus according to the present invention, and includes a regulator 200, a voltage sensor 201, a comparator 202, an output voltage adjusting unit 203, a controller 204, an output unit 205 including a regulating diode D and a smoothing condenser C, a transformer T, and a switching unit Q.

Figure 3:
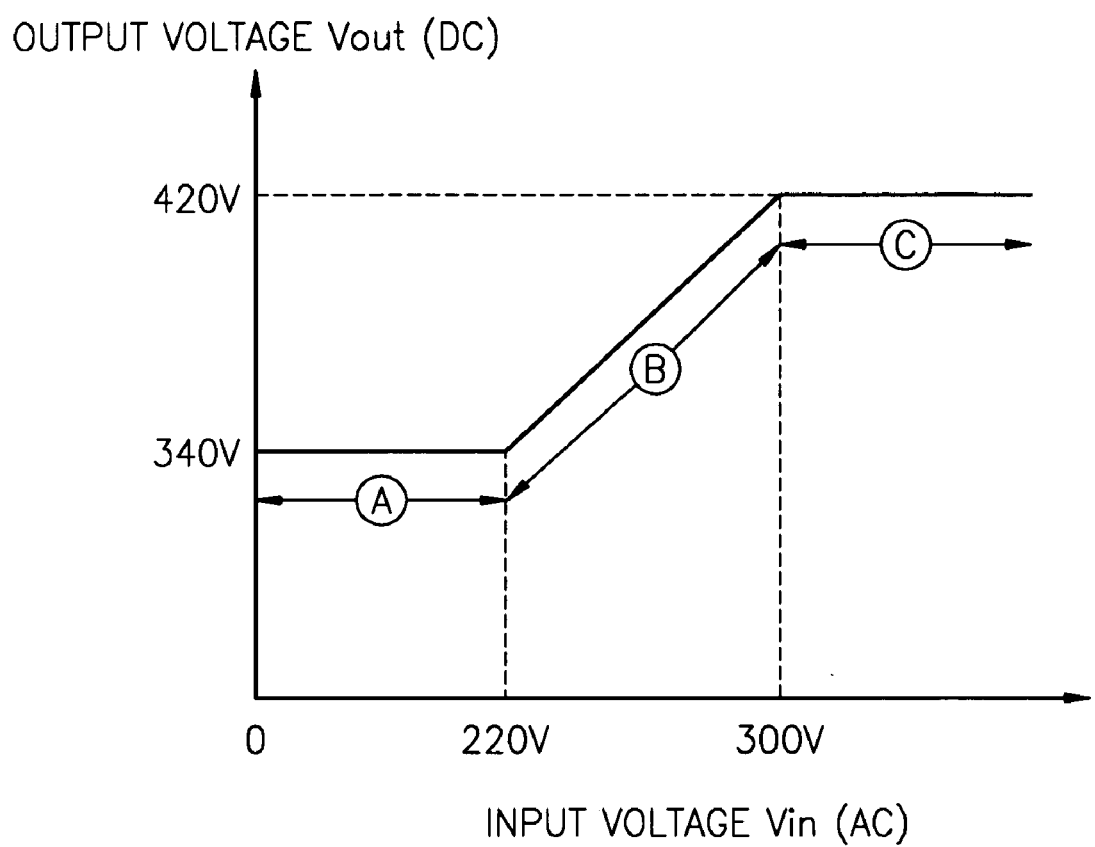

FIG. 3 is a graph of input voltage versus output voltage according to an embodiment to which FIG. 2 is applied. Since the output voltage variable value 340~420V shown in FIG. 3 is established as an embodiment, it is possible to adjust the output voltage according to a desired application.

With reference to FIGS. 2 and 3, the present invention is described in detail as follows.

The regulator 200 regulates an external AC voltage to a DC voltage and then outputs the DC voltage to a primary coil of the transformer T. The regulator 200 consists of a bridge diode circuit, and 90~260VAC, for example, is applied to it. The regulator 200 converts the input AC voltage into a DC voltage of a ripple waveform.

A transformer T inputs the DC voltage from the regulator 200, and then is switched according to a switching control signal applied from the switching unit Q, and finally induces the predetermined voltage to a secondary coil of the transformer T.

The voltage sensor 201 senses the input AC voltage. The voltage sensor 201, consisting of a condenser (not shown) senses the AC input voltage.

The comparator 202 compares the AC input voltage sensed in the voltage sensor 201 to a reference voltage and then outputs one of first through third comparison result signals.

In a case where the sensed AC input voltage is smaller than a first reference voltage, the comparator 202 outputs a first comparison result signal showing a first fixed output voltage section. With reference to FIG. 3, the first fixed output voltage section is depicted as section 'A.' For example, if the voltage sensor 201 senses an AC input voltage of 0~220V, the comparator 202 compares the sensed AC input voltage to the first reference value and then outputs the first comparison result signal showing the first fixed output voltage section.

In a case where the sensed AC input voltage is between the first reference voltage and a second reference voltage, the comparator 202 outputs a second comparison result signal showing a linear output voltage section. With reference to FIG. 3, the linear output voltage section is depicted as section 'B.' For example, if the voltage sensor 201 senses the AC input voltage of 220V~300V, the comparator 202 compares the sensed AC input voltage to the first reference value and second reference value and then outputs the second comparison result signal showing the linear output voltage section. An amplifier is included but not shown, and amplifies the second comparison result signal greater than an established level and then outputs the amplified signal.

In a case where the sensed AC input voltage is less than a third reference voltage, the comparator 202 outputs a third comparison result signal showing a second fixed output voltage section. With reference to FIG. 3, the second fixed output voltage section is depicted as section 'C.' For example, if the voltage sensor 201 senses an AC input voltage of greater than 300V, the comparator 202 compares the sensed AC input voltage to the second reference value and then outputs the third comparison result signal showing the second fixed output voltage section.

The output voltage adjusting unit 203 outputs one of the first through third output voltage level adjustment signals for changing the output voltage level according to the feedback output voltage signal and one of the first through third comparison result signals received from the comparator 202.

The output voltage adjusting unit 203 outputs the first output voltage level adjustment signal which changes the feedback output voltage level according to the first comparison result signal into the predetermined fixed voltage level by adjusting the internal divided resistors (not shown). With reference to FIG. 3 as an embodiment, the output voltage adjusting unit 203 outputs the first output voltage level adjustment signal so that the output voltage 340V is output when the AC input voltage is 0~220V. Since the output voltage variable value 340~420V shown in FIG. 3 is established as an embodiment, it is possible to adjust the output voltage according to any desired application.

The output voltage adjusting unit 203 outputs the second output voltage level adjustment signal which changes the feedback output voltage level according to the second comparison result signal into the predetermined fixed voltage level by adjusting the internal divided resistors (not shown). With reference to FIG. 3 as an embodiment, the output voltage adjusting unit 203 outputs the second output voltage level adjustment signal so that the output voltage is output by changing into the input voltage×1.414+10~20V when the AC input voltage is 220V~300V.

The output voltage adjusting unit 203 outputs the third output voltage level adjustment signal changing the feedback output voltage level according to the third comparison result signal into the predetermined fixed voltage level by adjusting the internal divided resistors (not shown). With reference to FIG. 3 as an embodiment, the output voltage adjusting unit 203 outputs the third output voltage level adjustment signal so that the output voltage 420V is output when AC input voltage is larger than 300V.

The controller 204 receives one of the first through third output voltage level adjustment signals output from the output voltage adjusting unit 203 and then outputs a PWM signal, whose duty ratio is adjusted, to the switching unit Q. With reference to FIG. 3, the controller 204 receives the first output voltage level adjustment signal and then outputs a PWM signal for generating the output voltage 340V, which is a fixed voltage, to the switching unit Q. Also, the controller 204 receives the second output voltage level adjustment signal and then outputs a PWM signal for generating the output voltage of 340V~420V, which is a linear voltage, to the switching unit Q. Also, the controller 204 receives the third output voltage level adjustment signal and then outputs a PWM signal for generating the output voltage 420V to the switching unit Q. The output voltage of each section such as section A, B, and C is decided considering the required hold-up time, and the voltage condition and power efficiency of the power supplied by a particular country or province.

The switching unit Q includes a switching component Q1 such as an FET, and its on/off time is controlled by the PWM control signal output from the controller 204. Therefore, the switching unit Q switches the operation of the transformer T by the PWM signal output from the controller 204.

The output unit 205 outputs the predetermined voltage by regulating and smoothing the voltage induced to a secondary coil of the transformer T. The output unit 205 has a regulating diode D and a smoothing condenser C for regulating and smoothing the voltages induced to the secondary coil of the transformer T.

According to the present invention as described above, by adjusting the output voltage of a boost converter according to the input voltage, efficiency is increased because there is less power loss of the switching component, and the hold-up time may be adjusted even in a case of a low input AC voltage, and it is not necessary to redesign the power of a particular country or a province with unstable input voltage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A power supply apparatus comprising:
   a comparator which compares a sensed AC input voltage to a reference voltage and then outputs one of first through third comparison result signals;
   an output voltage adjusting unit which outputs one of first through third output voltage level adjustment signals for changing a feedback output voltage level according to one of the first through third comparison result signals;
   a controller which outputs a switching signal whose duty ratio is adjusted according to one of the first through third output voltage level adjustment signals; and
   an output unit which outputs a predetermined voltage by regulating and smoothing an input voltage induced to a secondary coil of a transformer by the switching signal.

2. The apparatus of claim 1 further comprising:
   a voltage sensor which senses the input AC voltage and then outputs the input AC voltage to the comparator.

3. The apparatus of claim 1, wherein the comparator
   outputs the first comparison result signal indicating a first fixed output voltage level in a case where the sensed AC input voltage is smaller than a first reference voltage,
   outputs the second comparison result signal indicating a linear output voltage level in a case where the sensed AC input voltage is between the first reference voltage and a second reference voltage, and
   outputs the third comparison result signal indicating a second fixed output voltage level in a case where the sensed AC input voltage is larger than the second reference voltage.

4. The apparatus of claim 3 further comprising:
   an amplifier which amplifies the second comparison result signal.

5. The apparatus of claim 1, wherein the output voltage adjusting unit
   outputs the first and third output voltage level adjustment signals which change the feedback output voltage level according to the first and third comparison result signals into the first and third fixed voltage levels, respectively, and
   outputs the second output voltage level adjustment signal which changes the feedback output voltage level according to the second comparison result signal into the linear voltage level.

6. The apparatus of claim 5, wherein the first through third output voltage levels are determined considering the required hold-up time, and the voltage condition and power efficiency of the power provided by a particular country or province.

* * * * *